(12) United States Patent
Liao et al.

(10) Patent No.: US 6,405,632 B1
(45) Date of Patent: Jun. 18, 2002

(54) PROTECTION DEVICE FOR CONTROLLING THE MOTION OF A PNEUMATIC ACTUATOR

(75) Inventors: Bohao Liao, Sollentuna; Urban Dahlberg, Stockholm, both of (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/786,413

(22) PCT Filed: Sep. 3, 1999

(86) PCT No.: PCT/SE99/01527

§ 371 (c)(1),
(2), (4) Date: Apr. 26, 2001

(87) PCT Pub. No.: WO00/14413

PCT Pub. Date: Mar. 16, 2000

(30) Foreign Application Priority Data

Sep. 4, 1998 (SE) .............................................. 9802996

(51) Int. Cl.⁷ .............................................. F15B 13/16
(52) U.S. Cl. ............................................ 91/361; 91/435
(58) Field of Search ...................... 91/458, 437, 361, 91/435; 60/468

(56) References Cited

U.S. PATENT DOCUMENTS 4,106,390 A * 8/1978 Kodaira et al. ................. 91/42
4,528,894 A * 7/1985 Crosby ........................ 91/361
4,779,513 A * 10/1988 Kimura ......................... 91/42
4,932,311 A * 6/1990 Mibu et al. .................... 91/361
5,031,431 A 7/1991 Naito
6,230,606 B1 * 5/2001 Sato ............................ 91/361

FOREIGN PATENT DOCUMENTS

| DE | 3 818 068 | 12/1988 |
|---|---|---|
| EP | 0 111 637 | 6/1984 |
| EP | 0 360 354 | 3/1990 |
| EP | 0 552 557 | 7/1993 |
| GB | 2 139 382 | 11/1984 |

* cited by examiner

Primary Examiner—Edward K. Look
Assistant Examiner—Igor Kershteyn
(74) Attorney, Agent, or Firm—Young & Thompson

(57) ABSTRACT

A protection device for controlling the motion of a pneumatic actuator, having at least one elongated cylinder provided with a piston, dividing the cylinder into a first chamber and a second chamber, an actuating pressure supply line connectable to at least one of the first and second chambers, a control unit for controlling the motion of the piston relatively to the cylinder, and a motion sensor adapted to sense a piston feature related to the piston motion and co-operating with the control unit. According to the invention, the control unit limits the motion of the piston as soon as signal from the sensor indicates that an excessive value of the piston motion has been established.

15 Claims, 5 Drawing Sheets

PROTECTION DEVICE FOR CONTROLLING THE MOTION OF A PNEUMATIC ACTUATOR

TECHNICAL FIELD OF THE INVENTION

The present invention relates to a protection device for controlling the motion of a pneumatic actuator, according to the preamble of claim 1.

Known pneumatic devices used in milking systems for milking an animal, e.g. a cow, suffers from disadvantages in that they do not include any satisfactory additional overload protection against kicks or other not desirable movements of the animal, furthermore they do not include any parallel protection function preventing a fast movement of the actuator in case of a malfunction of the control means comprising servo-pneumatic positioning elements. The known pneumatic devices suffers furthermore from disadvantages in that the protection function is performed in a not sufficiently quick manner. A milking system of this kind is described in for example EP-A-0 360 354.

It is, accordingly, an object of the present invention to overcome the problem of the known devices.

A further object of the invention is to provide a protection for the control of a pneumatic actuator comprising a piston against external accidental influence on the piston movement

SUMMARY OF THE INVENTION

This has been solved by a protection device as initially defined, which is characterized in that said control means limits the motion of said piston as soon as signalling from said sensor means indicates that an excessive value of said piston motion has been established.

Hereby is prevented that a fast movement of the piston relatively to the cylinder arises in case of a malfunction or if an animal or a person runs into a robot arm with operating said.

Preferably, a valve means controlled by said control means being connectable to said first and second chambers, and adapted to open a connection between said first and second chambers. Hereby an equalisation of pressure between the first and second chambers is achieved. The piston relatively to the cylinder is therefor flexible due to an external influence.

Suitably, said sensor means comprises a position sensor adapted to sense the position or the relative position per unit of time of said piston in relation to said cylinder, and that said control means is adapted to control said valve means to open in response to a signaling from said position sensor indicating that the value of the position change per unit of time is higher than a predetermined value. Hereby a value of the velocity of said actuator is determined A signal from the control means is given if the value of the motion is exceeded and an equalization of pressure between the first and second chambers is achieved.

Preferably, said sensor means comprises a differential pressure transductor adapted to sense the pressure difference between said first and second chambers, and that said control means is adapted to control said valve means to open in response to a signalling from said transductor indicating that the value of the pressure difference is higher than an estimated pressure composed by a model dependent on the actual control situation of said piston. Hereby an equalization of pressure between said first and second chambers is achieved.

Suitably, said model is derived by means of a Kalmar filter. Hereby is achieved a state, which not will be exceeded Preferably, said control means is divided into at least one separate control unit controlling the motion of said piston and at least one protective pressure control unit controlling the pressure difference between said first and second chambers, that the signal from said differential pressure tansductor is fed to said protective pressure control unit, that said valve means is controlled by said protective pressure control unit when the pressure difference value sensed by said transductor is higher than an estimated value in dependence on the actual control situation of the piston Hereby an equalization of the pressure between said first and second chambers is achieved even if a malfunction of the control means or the servo valve arises in a situation where an animal or a person runs into the robot arm.

Suitably, for each of said control unit and said protective pressure control unit, the differential pressure is compared with an estimated pressure, which is computed from a model derived by means of the Kalmar filter, and the control signal to said valve means. Hereby either a malfunction in the SW or in the HW do have an effect on the protection function Preferably, a valve means is associated with said control means, said valve means being connectable to said actuating pressure supply line and to at least one of said first and second chambers, a first valve means is connectable between said valve means and said first chamber, and a second valve means is connectable between said valve means and said second chamber, and a control valve means, connectable to said supply line and associated with said control means, being adapted to control said first and second valve means, and wherein said first and second valve means are in position for normal operation of the device in response to said sensor means, by said excessive value of said piston motion said valve means operates to equalize the pressure between said chambers. Hereby, when a malfunction or an external influence on the actuator arises, the first and second chambers are disconnected from the pressure source, without shutting down the supply line.

Suitably, a first pressure supply line is connectable between said first chamber and said valve means, a second pressure supply line is connectable between said second chamber and said valve means. Hereby the pneumatic pressure may have an effect on the piston relatively to the cylinder in at least one direction.

Preferably, a main valve means is associated with said control means and is connectable to at least one of said first and second chambers and to said actuating supply line. Hereby is achieved that the pressure generation into said device at least can be restrained Suitably, said robot arm comprises at least one pneumatic actuator for controlling the motion of said robot arm. Hereby is achieved a controllable motion of said robot arm.

Preferably, said robot arm is connected to a robot arm suspension means, which is furthermore hingedly connected to a support means, and said robot arm suspension means being arranged to said support means about an substantially horizontal axis, and at least one of said pneumatic actuators is arranged between said robot arm suspension means and said support means, for allowing said robot arm suspension means to perform a substantially pendulum movement about said substantially horizontal axis. Hereby is achieved that the arm has good access to e.g. teats and that the risk is less for dirt, such as manure, to hamper the movement of mechanical parts, as the connection between the robot arm suspension means and the support means is arranged at a level substantially above said animal.

Suitably, at least one of said pneumatic actuator is arranged between said robot arm and said support means, for actively moving said robot am in a substantially vertical plane. Hereby is achieved a controllable pendulum movement.

Preferably, said robot arm is pivotally connected to said robot arm suspension means, for allowing said robot arm to perform a pivotal movement in relation to said robot arm suspension means. Hereby is achieved a movability of the robot arm in addition to said pendulum movement.

Suitably, at least one of said pneumatic actuators is arranged between said robot arm and said robot arm suspension means, for actively moving said robot arm in a substantially sideward direction. Hereby is achieved a controllable pivotal movement.

Preferably, said robot arm suspension means comprises a pivot means having a bar movable about a substantially horizontal axis, said bar being provided with a first connection member for said robot arm and a second connection member for said at least one of said pneumatic actuators, each of said first and second connection members being provided with a hinge movable about a substantially vertical axis. Hereby a joint for the pivotal movement is achieved.

DRAWING SUMMARY

The invention will now be described more closely by examples with reference to the accompanying drawings, in which FIG. 1 illustrates the protection device according to a first embodiment of the invention, wherein a control means provided with a memory function opens a servo valve in response to a position sensor.

DETAILED DESCRIPTION OF THE INVENTION

Figure 1:
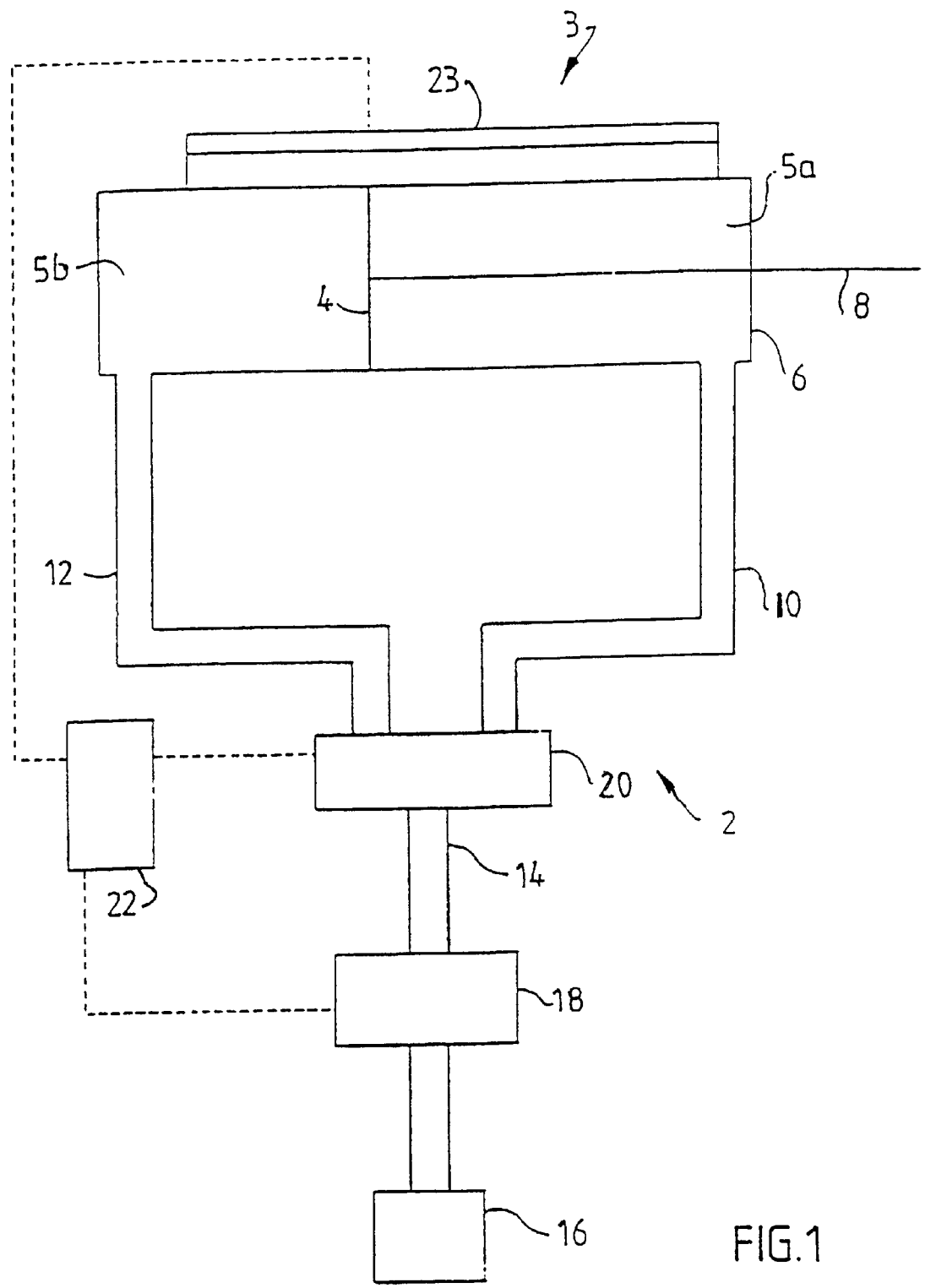

Referring to FIG. 1 a pneumatic device 2 comprises a pneumatic cylinder 6 provided with a piston 4 connected to a piston rod 8.

A first pressure line 10 is connected to a first chamber 5a of a cylinder 6 and to a servo valve 20. A second pressure line 12 is connected to a second chamber 5b of the cylinder 6 and to the servo valve 20. The servo valve 20 may be a 5/3 proportional flow control valve, and is controlled by a control unit 22 controlling the valve 20. The valve 20 operates to control the movement of the piston 4 inside the cylinder 6.

The servo valve 20 is connected to a pressure source 16 by a supply line 14 via a main valve 18.

A position sensor 23 is adapted to the cylinder 6 for sensing the position of the piston 4. The position sensor 23 is connected to a control means 22, which furthermore is connected to the servo valve 20 and to the main valve 18. The output of the sensor 23 is fed to a control unit 22, which for example can be an ordinary kind of computer and which controls the operation of the pneumatic devise 2. It is possible to have the position sensor 23 to indicate the speed of the piston 4, i.e. the position per unit of time. However, it is also possible to have the position as an output and provide the speed indication by the sampling rate.

The position sensor 23 may be a linear potentiometer inside or outside the cylinder 6 or a linear inductive contactless sensor. Also may at least one optical incremental encoder, rotary potentiometer or rotary incremental encoder, adapted on a robot arm which will be further described bellow in connection with FIG. 5, be used.

Figure 2:
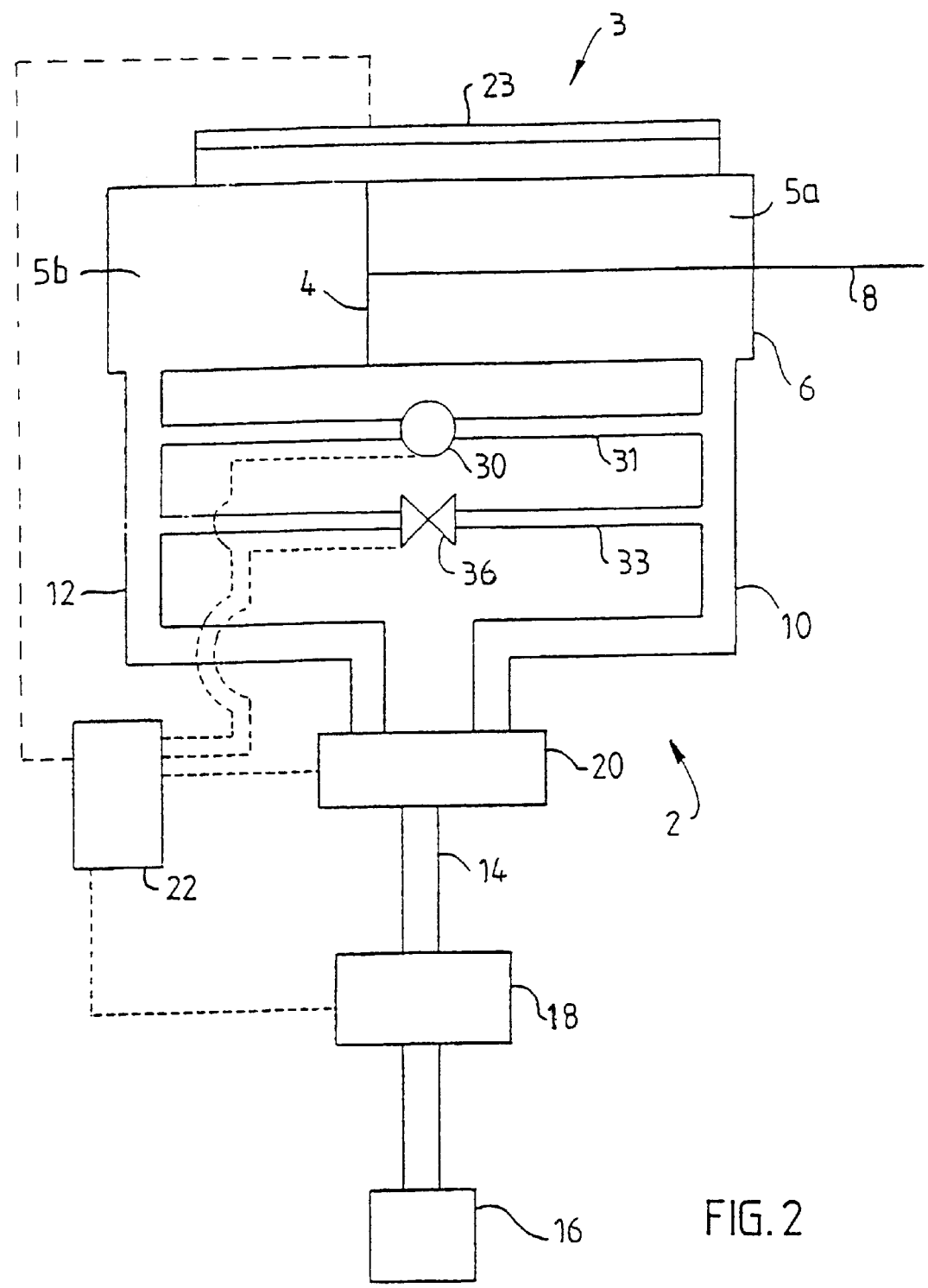
FIG. 2 illustrates the protection device according to a second embodiment of the invention, wherein the control means provided with a memory function opens an on/off valve in response to a differential pressure transductor and/or the position sensor.

FIG. 2 shows an example of a second embodiment of the invention, in which parts denoted with a reference sign correspond to parts of the first embodiment with the same reference sign.

The protection device according to the second embodiment thus includes a differential pressure transductor 30, which is provided in a first connection line 31 between the two chambers 5a and 5b, and in practice connects the first pressure supply line 10 and the second supply pressure line 12.

A valve 36 is arranged in a second connection line 33. The second pressure line 33 connect the first pressure line 10 and the second pressure line 12, and connect the two chambers 5a and 5b with each other.

Furthermore, the valve 36 and the transductor 30 are connected to the control unit 22.

The valve 36 may be an on/off valve.

Figure 3:
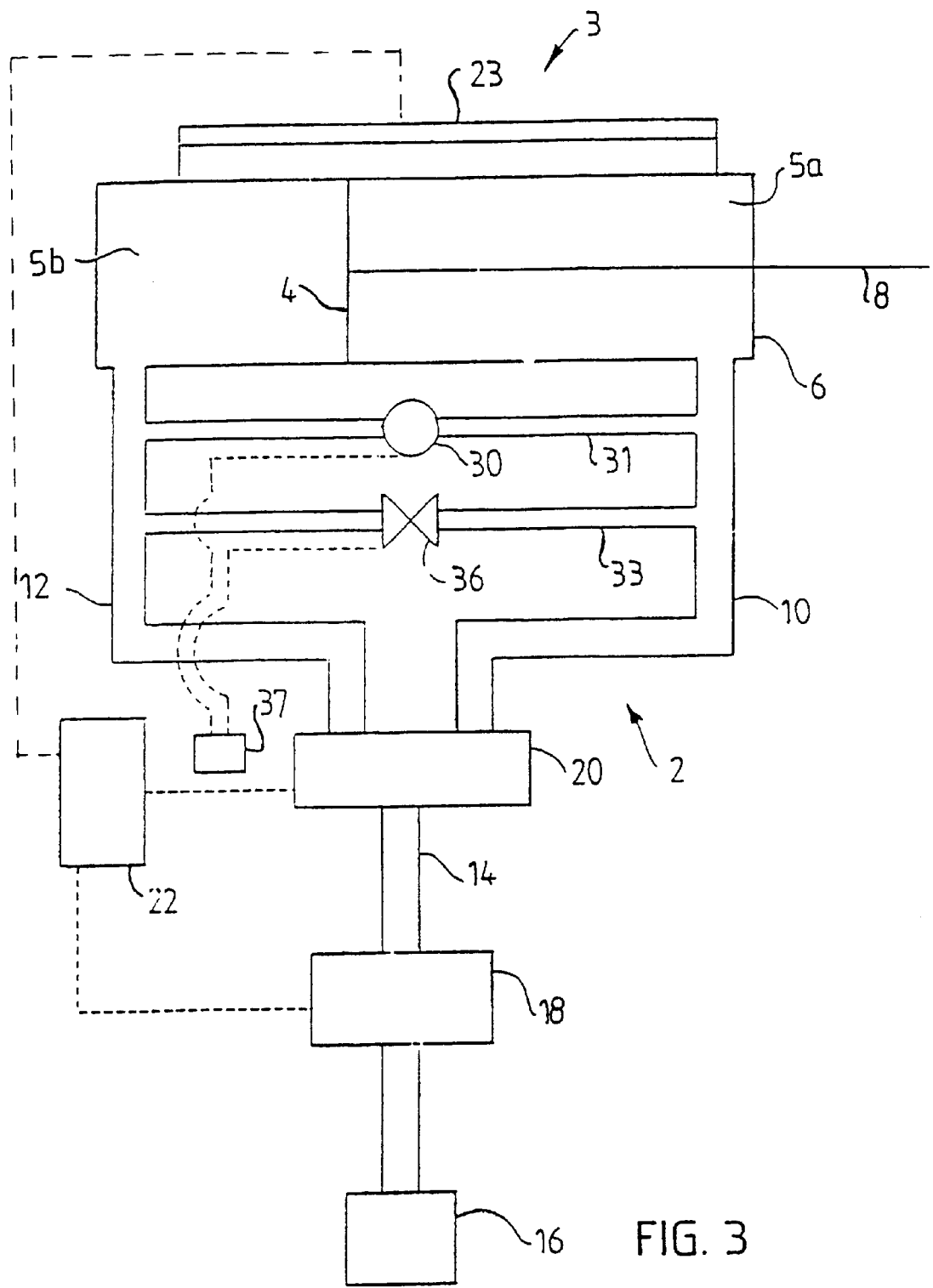
FIG. 3 illustrates the protection device according to a third embodiment of the invention, wherein either the differential pressure tansductor separately feed a signal to a protective pressure control unit for controlling an on/off valve or the control means controls the servo valve in response to the position sensor.

FIG. 3 shows an example of a third embodiment of the invention, in which parts denoted with a reference sign correspond to parts of the second embodiment with the same reference sign.

The protection device according to the second embodiment comprises a protective pressure control unit 37 associated with the valve 36 and the differential pressure transductor 30.

Furthermore, the valve 36 and the transductor 30 are preferably connected to the protective pressure control unit 37 separate from the control unit 22. The protective pressure control unit 37 could then be of a more simple kind than the control unit 22 and for example be a simple electronic circuit. However, it is also possible that the a protective pressure control unit 37 is a part of the control unit 22.

This arrangement implies that a parallel protection system is arranged, functioning parallelly with the embodiments described in FIGS. 1 and 2. The protection action is performed in a very quick response compared with known protection devises.

Figure 4:
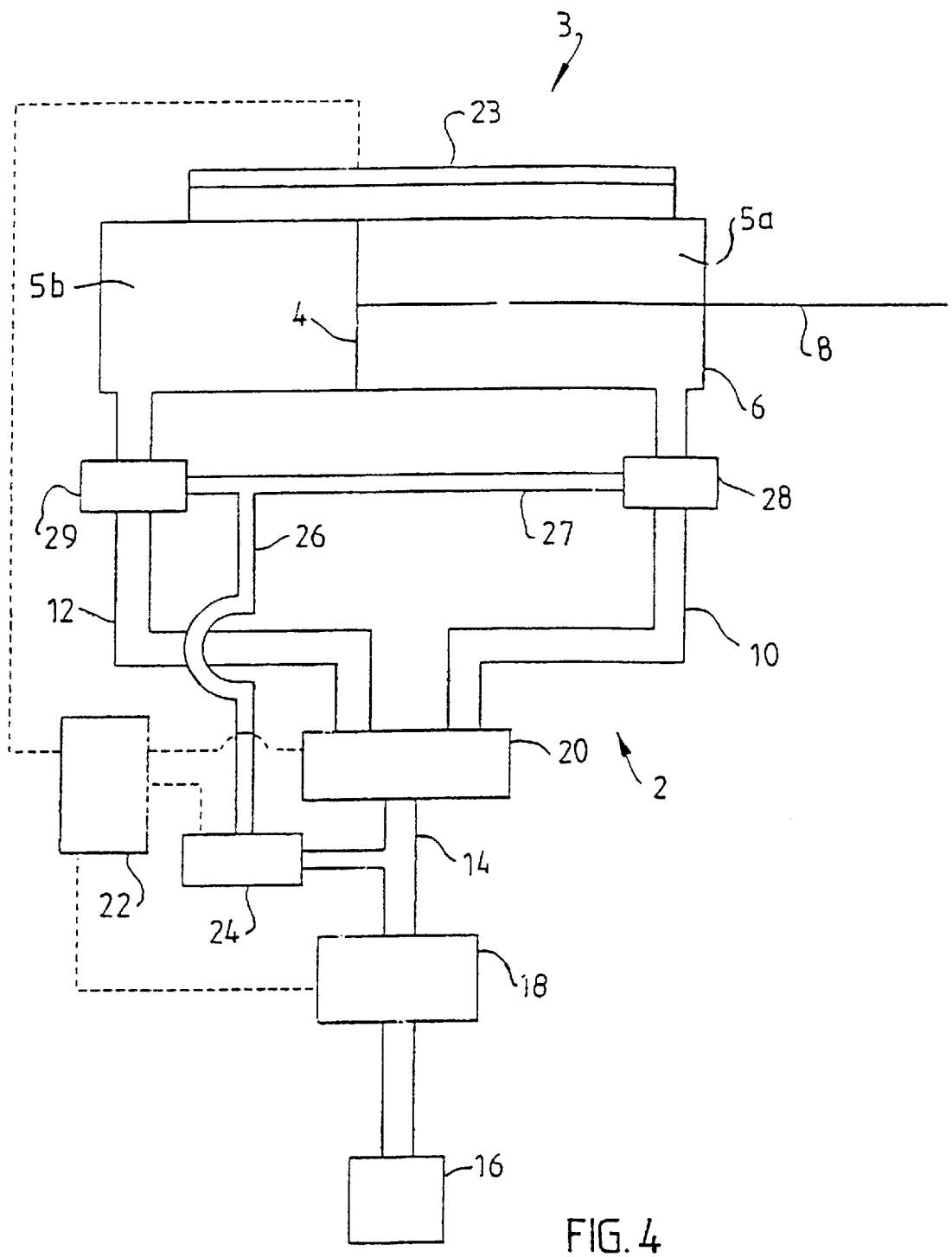
FIG. 4 illustrates the device according to a fourth embodiment of the invention, wherein the control means controls a first and a second check valve means by a control valve means.

FIG. 4 shows an example of a fourth embodiment of the invention, in which parts denoted with a reference sign correspond to parts of the first embodiment with the same reference sign.

The protection device according to the fourth embodiment thus includes a control valve 24, a first valve means 28 and a second valve means 29. The control valve 24 is connected to the supply line 14. A third connection line 26 is connected to a fourth connection line 27 and to the control valve 24. The fourth connection line 27 connects the first valve means 28 and the second valve means 29.

The first valve means 28 and second valve means 29 shown in the figure are check valves, but said valves may of course be valves constructed to open the connection between the first supply pressure line 10 and the second supply pressure line 12, with that the chambers 5a and 5b would have an open connection to each other through the connection line 27.

This embodiment may also comprise a differential pressure transductor and a valve means as are arranged in the earlier described embodiments.

A positive effect of this arrangement is that the actuator pressure supply line 14 never has to be shut down.

Figure 5:
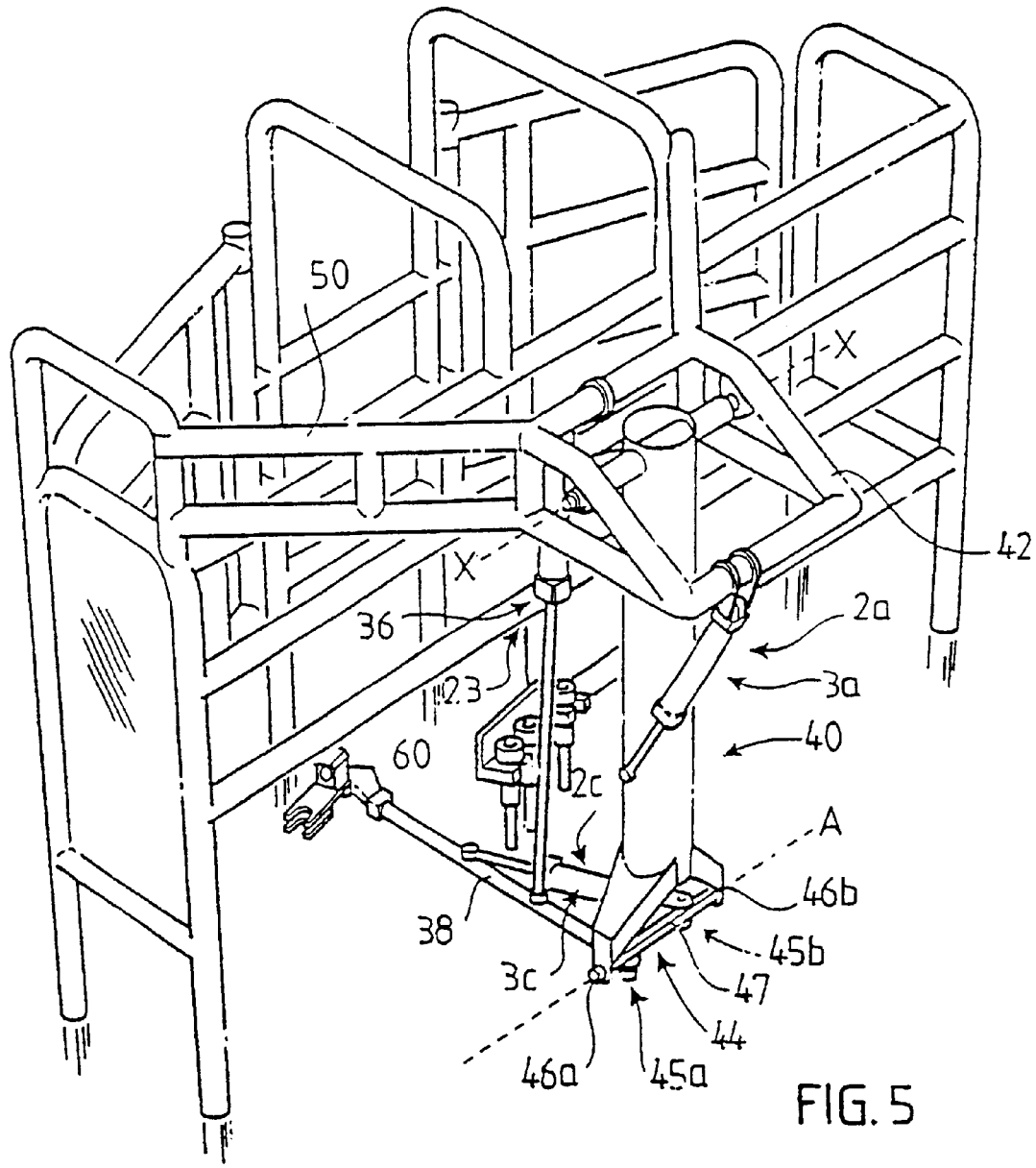
FIG. 5 illustrates an apparatus for performing an animal related operation arranged with the control devices 2a, 2b, 2c.

As shown in FIG. 5, which illustrates an embodiment of a milking machine in which the control devices 2a, 2b, 2c described above is inserted, a robot arm 38 is connected to a robot arm suspension means 40. The robot arm suspension means 40 is hingedly connected to a support means 42 and is arranged to said support means 42 about a horizontal axis (X-X).

The support means 42 is connected to a railing 50 of an animal stall 60.

The robot arm 38 is pivotally connected to the robot arm suspension means 40.

A first pneumatic actuator 3a is arranged between the robot arm suspension means 40 and the support means 42.

A second pneumatic actuator 3b is arranged between the robot arm 38 and said support means 42.

A third pneumatic actuator 3c is arranged between the robot arm 38 and the robot arm suspension means 40.

Furthermore, the robot arm 38 is connected to the suspension means 40 via a pivot means 44, including a tubular member 47, movable about a pair of hinge members 46a, 46b, the tubular member 47 forming a substantially horizontal axis A-A, and furthermore via said third pneumatic actuator 3c connected to the tubular member 47 of the pivot means 44.

The first, second and third pneumatic actuator 3a, 3b, 3c could be connected to a common control means (not shown) or separately to its own special control means 22, 37 (not shown).

OPERATION

Of course it is very important that service personnel inside the robot area or an animal to be milked do not run the risk of a hit with the robot arm. If the risk of an abnormal motion of the robot arm for any reason come into existence, the invention prevent such an undesired motion by the described protection device.

Thereby either the service personnel or the animal get a hit from the robot arm in case of a malfunction.

An animal to be milked, such as a cow, wish undoubtedly to evacuate the milking robot if a malfunction arises. The safety function according to the invention could be connected to a release function and a grid opening function.

Subsequently, the grid of the milking robot will be opened if an abnormal movement of the cow arises.

The safety function according to the invention could furthermore be associated with an alarm function if a malfunction come into existence or if a risk of an abnormal motion of the robot arm for any reason come into existence.

The arrangement according to the invention implies two parallel protection systems, of which at least one first control system is included in the software and at least one second differential pressure control system is included in the hardware, i.e. respectively the control unit system and the protective pressure control unit system.

This implies that if one protection system would be out of order and at this very moment an accidental movement of the piston arises, the other protection system still would correct this fact.

By means of the arrangement with the differential pressure transductor the action is performed in a very quick response compared with known protection devises.

Even though the invention was developed for milking machines the device according to the invention has a number of other applications where pneumatically controlled pistons are involved.

What is claimed is:

1. A protection device for controlling the motion of a pneumatic actuator (3), comprising at least one elongated cylinder (6) provided with a piston (4), dividing the cylinder (6) into a first chamber (5a) and a second chamber (5b), an actuating pressure supply line (14) connectable to at least one of said first and second chambers (5a, 5b), a control means (22) for controlling the motion of the piston (4) relatively to the cylinder (6), and a sensor means (23, 30) adapted to sense a piston feature related to the piston motion and being co-operating with the control means (22), said control means (22) limits the motion of said piston (4) as soon as signaling from said sensor means (22, 30) indicates that an excessive value of said piston motion has been established, characterized in that a valve means (20, 36, 28, 29) controlled by said control means (22), said valve means (20, 36, 28, 29) being connectable to said first and second chambers (5a, 5b), and adapted to open a connection between said first and second chambers (5a, 5b).

2. A device according to claim 1, wherein said sensor means comprises a position sensor (23) adapted to sense the position or the relative position per unit of time of said piston (4) in relation to said cylinder (6), and that said control means (22) is adapted to control said valve means (20) to open in response to a signalling from said position sensor (23) indicating that the value of the position change per unit of time is higher than a predetermined value.

3. A device according to claim 1, wherein said sensor means comprises a differential pressure transductor (30) adapted to sense the pressure difference between said first and second chambers (5a, 5b), and that said control means (22) is adapted to control said valve means (36) to open in response to a signalling from said transductor (30) indicating that the value of the pressure difference is higher than an estimated pressure composed by a model dependent on the actual control situation of said piston (4).

4. A device according to claim 3, wherein said model is derived by means of a Kalmar filter.

5. A device according to claim 3, wherein said control means (22) is divided into at least one separate control unit (22) controlling the motion of said piston (4) and at least one protective pressure control unit (37) controlling the pressure difference between said first and second chambers (5a, 5b), that the signal from said differential pressure transductor (30) is fed to said protective pressure control unit (37), that said valve means (36) is controlled by said protective pressure control unit (37) when the pressure difference value sensed by said transductor (30) is higher than an estimated value in dependence on the actual control situation of the piston (4).

6. A device according to claim 5, wherein each of said control unit (22) and said protective pressure control unit (37), the differential pressure is compared with an estimated pressure, which is computed from a model derived by means of a Kalmar filter, and the control signal to said valve means (20).

7. A device according to claim 1, wherein a valve means (20) is associated with said control means (22), said valve means (20) being connectable to said actuating pressure supply line (14) and to at least one of said first and second chambers (5a, 5b), a first valve means (28) is connectable between said valve means (20) and said first chamber (5a), and a second valve means (29) is connectable between said valve means (20) and said second chamber (5b), and a control valve means (24), connectable to said supply line (14) and associated with said control means (22), being adapted to control said first and second valve means (28, 29), and wherein said first and second valve means (28, 29) are in position for normal operation of the device in response to said sensor means (23, 30), by said excessive value of said piston motion said valve means (28, 29) operates to equalize the pressure between said chambers (5a, 5b).

8. A device according to claim 1, wherein a first pressure supply line (10) is connectable between said first chamber (5a) and said valve means (20), a second pressure supply line (12) is connectable between said second chamber (5b) and said valve means (20).

9. A device according to claim 1, wherein a main valve means (18) is associated with said control means (22) and is connectable to at least one of said first and second chambers (5a, 5b) and to said actuating supply line (14).

10. An apparatus for performing and animal related operation having a robot arm (38), wherein said robot arm (38) comprises at least one protection device (2a, 2b, 2c) according to claim 1 for controlling the motion of said robot arm (38).

11. An apparatus according to claim 10, wherein said robot arm (38) is connected to a robot arm suspension means (40), which is furthermore hingedly connected to a support means (42), and said robot arm suspension means (40) being arranged to said support means (42) about an essential horizontal axis (X—X) and at least one of said protection devices (2a) is arranged between said robot arm suspension means (40) and said support means (42), for allowing said robot suspension means (40) to perform a substantially pendulum movement about said essential horizontal axis (X—X).

12. An apparatus, according to claim 10, wherein at least one of said protection devices (2b) is arranged between said robot arm (38) and said support means (42), for actively moving said robot arm (38) in a substantially vertical plane.

13. An apparatus, according to claim 12, wherein said robot arm (38) is pivotally connected to said robot arm suspension means (40), for allowing said robot arm (38) to perform a pivotal movement in relation to said robot arm suspension means (40).

14. An apparatus, according to claim 13, wherein at least one of said protection devices (2c) is arranged between said robot arm (38) and said robot arm suspension means (40), for actively moving said robot arm (38) in a substantially sideward direction.

15. An apparatus, according to claim 14, wherein said robot arm suspension means (40) comprises a pivot means (44) having a bar movable about a substantially horizontal axis (A—A), said bar being provided with a first connection member (45) for said robot arm (38) and a second connection member (46) for said at least one of said protection devices (3c), each of said first and second connection members (45, 46) being provided with a hinge movable about a substantially vertical axis.

* * * * *